(12) United States Patent
Yan et al.

(10) Patent No.: US 12,480,133 B1
(45) Date of Patent: Nov. 25, 2025

(54) **USE OF PYRAMID OF ZLRc AND ZLRd GENES FROM *Zizania latifolia* IN INCREASING POLYPHENOL CONTENT OF RICE SEED**

(71) Applicants: Tobacco Research Institute of Chinese Academy of Agricultural Sciences (Qingzhou Tobacco Research Institute of China National Tobacco Company), Qingdao (CN); Wuhan Tianwen Biotechnology Co., Ltd., Hubei (CN)

(72) Inventors: Ning Yan, Qingdao (CN); Wanhong Li, Qingdao (CN); Qing Ma, Qingdao (CN); Nuosi Lin, Hubei (CN); Xi Chen, Hubei (CN); Yali Li, Qingdao (CN); Lixia Wang, Qingdao (CN); Hongbo Zhang, Qingdao (CN); Zhongfeng Zhang, Qingdao (CN)

(73) Assignees: Tobacco Research Institute of Chinese Academy of Agricultural Sciences (Qingzhou Tobacco Research Institute of China National Tobacco Company), Qingdao (CN); Wuhan Tianwen Biotechnology Co., Ltd., Hubei (CN)

( * ) Notice: Subject to any disclaimer, the term of this patent is extended or adjusted under 35 U.S.C. 154(b) by 0 days.

(21) Appl. No.: 18/818,947

(22) Filed: Aug. 29, 2024

(30) Foreign Application Priority Data

May 21, 2024 (CN) .......................... 202410711593.6

(51) Int. Cl.
*C12N 15/82* (2006.01)

(52) U.S. Cl.
CPC ..... *C12N 15/8242* (2013.01); *C12N 15/8205* (2013.01)

(58) Field of Classification Search
None
See application file for complete search history.

(56) References Cited

FOREIGN PATENT DOCUMENTS

CN 114231540 A * 3/2022 .......... C07K 14/415

* cited by examiner

*Primary Examiner* — Charles Logsdon
*Assistant Examiner* — Jessica Nicole Stockdale
(74) *Attorney, Agent, or Firm* — WCF IP (57) ABSTRACT

Disclosed is use of a pyramid of ZlRc and ZlRd genes from *Zizania latifolia* in increasing a polyphenol content of a rice seed, which relates to the technical field of plant genetic engineering. The nucleotide sequence of ZlRd gene is set forth in SEQ ID NO: 1, and the nucleotide sequence of ZlRc gene is set forth in SEQ ID NO: 2. The purpose of the present disclosure is to increase the polyphenol content in the rice seed and simultaneously overexpress ZlRc and ZlRd genes in rice.

4 Claims, 8 Drawing Sheets
Specification includes a Sequence Listing.

USE OF PYRAMID OF ZLRc AND ZLRd GENES FROM *Zizania latifolia* IN INCREASING POLYPHENOL CONTENT OF RICE SEED

CROSS REFERENCE TO RELATED APPLICATION

The patent application claims the benefit and priority of Chinese Patent Application No. 202410711593.6 filed with the China National Intellectual Property Administration on May 21, 2024, the disclosure of which is incorporated by reference herein in its entirety as part of the present application.

REFERENCE TO SEQUENCE LISTING

A computer readable XML file entitled "Sequence Listing", that was created on Aug. 20, 2024, with a file size of 20,161 bytes, contains the sequence listing for this application, has been filed with this application, and is hereby incorporated by reference in its entirety.

TECHNICAL FIELD

The present disclosure belongs to the technical field of plant genetic engineering, and particularly relates to use of a pyramid of ZlRc and ZlRd genes from *Zizania latifolia* in increasing a polyphenol content of a rice seed.

BACKGROUND

Polyphenol compounds include phenolic acids and flavonoids. The phenolic acids in rice seed mainly include hydroxybenzoic acids and hydroxycinnamic acids. The flavonoids are a class of compounds composed of two aromatic rings and a heterocyclic C3 structure (C6-C3-C6). Due to the differences in heterocyclic structures, the flavonoids are divided into six categories: flavonols, flavones, catechols, flavanones, anthocyanidins, and isoflavones. Flavonoids generally exist in the form of glycosides linked to some saccharides. The content and type of flavonoids in rice are directly related to the color of the rice, and vary greatly among different varieties. Most black rices mainly contain anthocyanins, and some black rices contain proanthocyanidins; most red rices mainly contain proanthocyanidins, but not anthocyanidins. Polyphenol compounds in rice have a wide range of biological activities, including antioxidant, free radical scavenging, anti-tumor, anti-atherosclerosis, hypoglycemics, and anti-allergic activities. Colored rice rich in the polyphenol compounds has important application value in the fields of medicine and food.

Currently, most cultivated rice is white, while most wild rice is red. Grain color has always been an important goal in domestication, and the domestication of Rc and Rd is the selection of color in rice seed coat. Existing studies have shown that red rice is mainly controlled by the expression of two genes, namely Rc on chromosome 7 and Rd on chromosome 1. Rc encodes basic helix-loop-helix (bHLH) transcription factor, while Rd encodes dihydroflavonol 4-reductase (DFR). Rc is a determining factor in the biosynthesis of proanthocyanidins in rice seed coat and has a complementary effect with Rd. When only Rc is present, the rice seed coat exhibits brown; when only Rd is present, the rice seed coat shows colorless; and when Rc and Rd are present simultaneously, the rice seed coat is red.

*Zizania latifolia* resources are extremely abundant in China. Studies show that wild *Zizania latifolia* from the middle and lower reaches of the Yangtze River is a desirable candidate for domestication of cereal crops. The caryopsis of *Zizania latifolia* is known as Chinese wild rice. As a kind of whole grain that contains phenolic acids, flavonoids, and other polyphenols with excellent antioxidant properties, the Chinese wild rice shows a high potential in functional food ingredients. The Chinese wild rice is rich in polyphenol compounds, with total polyphenol, total flavonoid, and total proanthocyanidin contents up to 7 times, 3 times, and 6 times that of ordinary rice, and antioxidant activity up to 4 times that of ordinary rice. The key genes for flavonoid biosynthesis in *Zizania latifolia* include structural genes and regulatory genes. Among them, Rc encodes bHLH transcription factor, which is a regulatory gene for flavonoid biosynthesis; Rd encodes DFR, which is a structural gene for flavonoid biosynthesis. In summary, the discovery of key regulatory genes and structural genes for polyphenol compound biosynthesis in *Zizania latifolia* shows important practical significance and application prospects for innovating functional rice varieties rich in polyphenols, improving residents' dietary structure, and reducing dietary risk factors that cause chronic diseases.

SUMMARY

In order to solve the above problems existing in the prior art, a purpose of the present disclosure is to propose use of the pyramid of ZlRc and ZlRd genes from *Zizania latifolia* in increasing the polyphenol content of rice seed. In the present disclosure, for the purpose of increasing the polyphenol content of the rice seed, two DNA fragments containing the ZlRc and ZlRd genes are separated and used. When the two DNA fragments pyramid and overexpress the ZlRc and ZlRd genes driven by a constitutive promoter, the polyphenol content of the rice seed is significantly increased.

The technical solutions of the present disclosure are as follows:

The present disclosure provides use of a pyramid of ZlRc and ZlRd genes from *Zizania latifolia* in increasing a polyphenol content of a rice seed, where the nucleotide sequence of ZlRd gene is set forth in SEQ ID NO: 1, and the nucleotide sequence of ZlRc gene is set forth in SEQ ID NO: 2.

Further, a protein encoded by ZlRd gene has the amino acid sequence set forth in SEQ ID NO: 5, and a protein encoded by ZlRd gene has the amino acid sequence set forth in SEQ ID NO: 6.

In some embodiments, transferring a constructed overexpression vector of the pyramid of ZlRc and ZlRd genes into rice to obtain a transgenic rice plant that overexpresses the ZlRc and ZlRd genes simultaneously.

In some embodiments, constructing sequences of ZlRc and ZlRd genes on the overexpression vector in sequence, transferring the overexpression vector into the rice, and obtaining the transgenic rice plant with a significantly increased polyphenol content in a seed by increasing expression levels of mRNAs of ZlRc and ZlRd genes.

In some embodiments, transferring the overexpression vector into an *Agrobacterium* strain through chemical transformation, obtaining an independent transformant by infecting a callus with the *Agrobacterium* strain, and plant regenerating the independent transformant to obtain the transgenic rice plant.

The technical scheme of the present disclosure has the following beneficial effects:

(1) In the present disclosure, genomic DNA fragments with encoding sequences of ZlRc and ZlRd genes is amplified form a cDNA library of Zizania latifolia by PCR, respectively. These two encoding sequences are constructed into the overexpression vector PC2300S in sequence, and rice is transformed with the overexpression vector. The transgenic rice plant with a significantly increased polyphenol content in seeds can be obtained by increasing expression levels of the ZlRc and ZlRd genes.

(2) The present disclosure provides use of the pyramid of ZlRc and ZlRd genes from Zizania latifolia in increasing the polyphenol content of rice seed. In the present disclosure, ZlRc and ZlRd genes can be effectively pyramided and overexpressed in rice. Under the same growth environment as the control plant, seeds harvested from rice containing the pyramid of ZlRc or ZlRd genes have higher total phenol, total flavonoid, and total proanthocyanidin contents, as well as higher DPPH free radical scavenging capacity and ABTS$\cdot^+$ free radical absorbing capacity compared to the control group. This shows that pyramid and overexpression of ZlRc and ZlRd genes has an effective regulatory effect on the synthesis pathway of polyphenol compounds in rice, increasing the polyphenol content in transgenic rice seeds, thereby causing the rice seeds to change from colorless to dark brown.

(3) In the present disclosure, based on the sequencing results of Zizania latifolia genome, the structural gene ZlRd that controls polyphenol biosynthesis are cloned in the Zizania latifolia through collinearity analysis with the rice genome. Biological function verification has showed that the pyramid and overexpression of ZlRc and ZlRd genes can significantly increase the polyphenol content in transgenic rice seeds, confirming the application approach and method of the pyramid of ZlRc and ZlRd genes in Zizania latifolia in increasing the polyphenol content of rice seed.

BRIEF DESCRIPTION OF THE DRAWINGS

FIG. 1B is a continuation of FIG. 1A. As shown in FIGS. 1A-1B, the nucleotide sequences of ZlRd and Rd have a certain degree of identity, and their several sites are conserved. Explanation of figure markings is: in FIGS. 1A-1B, Rd (the nucleotide sequence of Rd gene is set forth in SEQ ID NO: 16) represents the gene in rice that is homologous to the gene of the technical scheme of the present disclosure, and the ZlRd gene (the nucleotide sequence of ZlRd gene is set forth in SEQ ID NO: 1) represents the gene cloned in the technical scheme of the present disclosure;

FIGS. 5A-5B show electrophoresis detection results of the PCR products of ZlRc and ZlRd genes in Example 2; where

FIGS. 6A-6C show phenotypic observation on transgenic rice seeds of the control, ZlRd single gene, and pyramid of ZlRc and ZlRd genes in Example 3; where FIG. 6A shows the seeds of control rice.

DETAILED DESCRIPTION OF THE EMBODIMENTS

The technical solutions of the embodiments of the present disclosure are clearly and completely described below with reference to the drawings and the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

Unless otherwise specified, the experimental methods described in the following examples are all conventional methods. The methods shall be conducted in accordance with the techniques or conditions described in the literature in the art or in accordance with the product specification. All materials and reagents used in the following examples may be commercially available, unless otherwise specified.

The biological materials used in the following examples were: *Zizania latifolia* is collected from Huai'an, Jiangsu, China; control rice is Nipponbare rice, and its seeds are from Wuhan, Hubei, China.

Example 1 Acquisition of ZlRd and ZlRc Genes

I. Acquisition of ZlRd Gene
1. Extraction of Total RNA from *Zizania latifolia* and Preparation of cDNA
1.1 Extraction of Total RNA from *Zizania latifolia*

RNA from *Zizania latifolia* leaves was extracted using the polysaccharide and polyphenol plant RNA extraction kit (FastPure® Universal Plant Total RNA Isolation Kit, Vazyme) and then reverse-transcribed into cDNA. The extraction of RNA from *Zizania latifolia* leaves was conducted according to the instructions of the plant RNA extraction kit, with the specific experimental method steps as follows:

(1) The sample of the *Zizania latifolia* leaves was quickly ground into powder in liquid nitrogen, 50 mg of the ground sample was weighed and added into 500 μL of Bufer PRL preheated at 65° C., and immediately vortex-shaken vigorously for 60 s.

(2) The resulting lysate was treated twice in the 65° C. water bath for 5 min with inverting 2 times during this period, centrifuged at 12,000 rpm for 10 min, the obtained supernatant was transferred to a new 1.5 mL RNase-free centrifuge tube, added with absolute ethanol at 0.5 folds volume of the supernatant, and then the mixture was mixed immediately by pipetting.

(3) The resulting mixture was transferred to a FastPure gDNA-Filter Column II, centrifuged at 12,000 rpm for 2 min, and the resulting filtrate was discarded.

(4) 500 μL of Buffer PRL Plus was added into the FastPure gDNA-Filter Column II, centrifuged at 12,000 rpm for 30 s, and the resulting filtrate was collected.

(5) 0.5 folds volume of absolute ethanol was added to the filtrate and mixed immediately by pipetting; the resulting mixture was transferred to a FastPure RNA Column IV, centrifuged at 12,000 rpm for 2 min, and the resulting filtrate was discarded.

(6) 700 μL of Buffer PRW1 was added into the FastPure RNA Column IV, allowed to stand at room temperature for 1 min, centrifuged at 12,000 rpm for 30 s, and a resulting filtrate was discarded.

(7) 500 μL of Buffer PRW2 was added into the FastPure RNA Column IV, centrifuged at 12,000 rpm for 30 s, and a resulting filtrate was collected. This step was repeated once.

(8) The FastPure RNA Column IV was centrifuged at 12,000 rpm for 2 min without agents, to remove the remaining Buffer PRW2 in the FastPure RNA Column IV.

(9) The FastPure RNA Column IV was transferred to a new 1.5 mL RNase-free centrifuge tube, 40 μL of RNase-free ddH$_2$O was added dropwise into the center of a membrane of the adsorption column, allowed to stand at room temperature for 2 min, and centrifuged at 12,000 rpm for 1 min.

1.2 Preparation of cDNA:

After RNA extraction, the concentration of the RNA was measured, and 2.0 μg of the RNA was taken from each sample as a substrate for reverse transcription. The reverse transcription was conducted using a reverse transcription kit to obtain a cDNA product, which was stored in a −20° C. refrigerator for later use.

TABLE 1

PCR system and procedures for reverse transcription

| Component | System | |
|---|---|---|
| ddH$_2$O | 5 μL | 10 μL |
| Oligo dT Primer | 1 μL | |
| dNTP Mixture | 2 μL | |
| RNA | 2 μg | |
| PCR: 65° C., 5 min; | | |
| Resulting PCR product | 10 μL | 20 μL |
| 5 × primerScript II Buffer | 4 μL | |
| RNase Inhibitor | 0.5 μL | |
| Primer Script II RTase | 1 μL | |
| RNase free dH$_2$O | 4.5 μL | |
| PCR: 42° C., 1 h; 70° C., 15 min | | |

2. Amplification of ZlRd Gene

The primers designed based on the ZlRd gene sequence were as follows:

ZlRd-F: 5'-ATGGAGGAGACGGCGGC-3' (SEQ ID NO: 3);

ZlRd-R: 5'-TTATGTTTCAGCAACAATTGGTGGCT-3' (SEQ ID NO: 4).

PCR amplification was conducted using the cDNA of ZlRd as a template and the above primers, to obtain a target fragment ZlRd. The system and reaction procedures of PCR amplification were as follows:

TABLE 2

PCR system and procedures

| Component | System |
|---|---|
| CDNA | 1 μL |
| 10 × Buffer | 5 μL |
| dNTP Mixture (10 mM) | 1 μL |
| Primer F (10 μM) | 1 μL |
| Primer R (10 μM) | 1 μL |
| KOD (1 U/μL) | 1 μL |
| ddH$_2$O | up to 50 μL |
| PCR procedure | |

| Step | Number of cycles |
|---|---|
| 94° C. for 5 min | 1 |
| 98° C. for 30 s | 32 |
| 56° C. for 30 s | |
| 68° C. for 2 min | |
| 68° C. for 5 min | 1 |
| 25° C. for 1 min | 1 |

The PCR product was sequenced, and the sequence had a full length of 1,071 bp, with the nucleotide sequence as shown in SEQ ID NO: 1 and the amino acid sequence as shown in SEQ ID NO: 5.

II. Acquisition of ZlRc Gene

The method was the same as the method for acquiring ZlRd gene. The sequence of ZlRc gene had a total length of 1,971 bp, with the nucleotide sequence as shown in SEQ ID NO: 2, and the amino acid sequence as shown in SEQ ID NO: 6.

Example 2 Construction and Genetic Transformation of Overexpression Vector of the Pyramid of ZlRc and ZlRd Genes

2.1 Construction of Overexpression Vector for ZlRd Gene

Figure 1A:
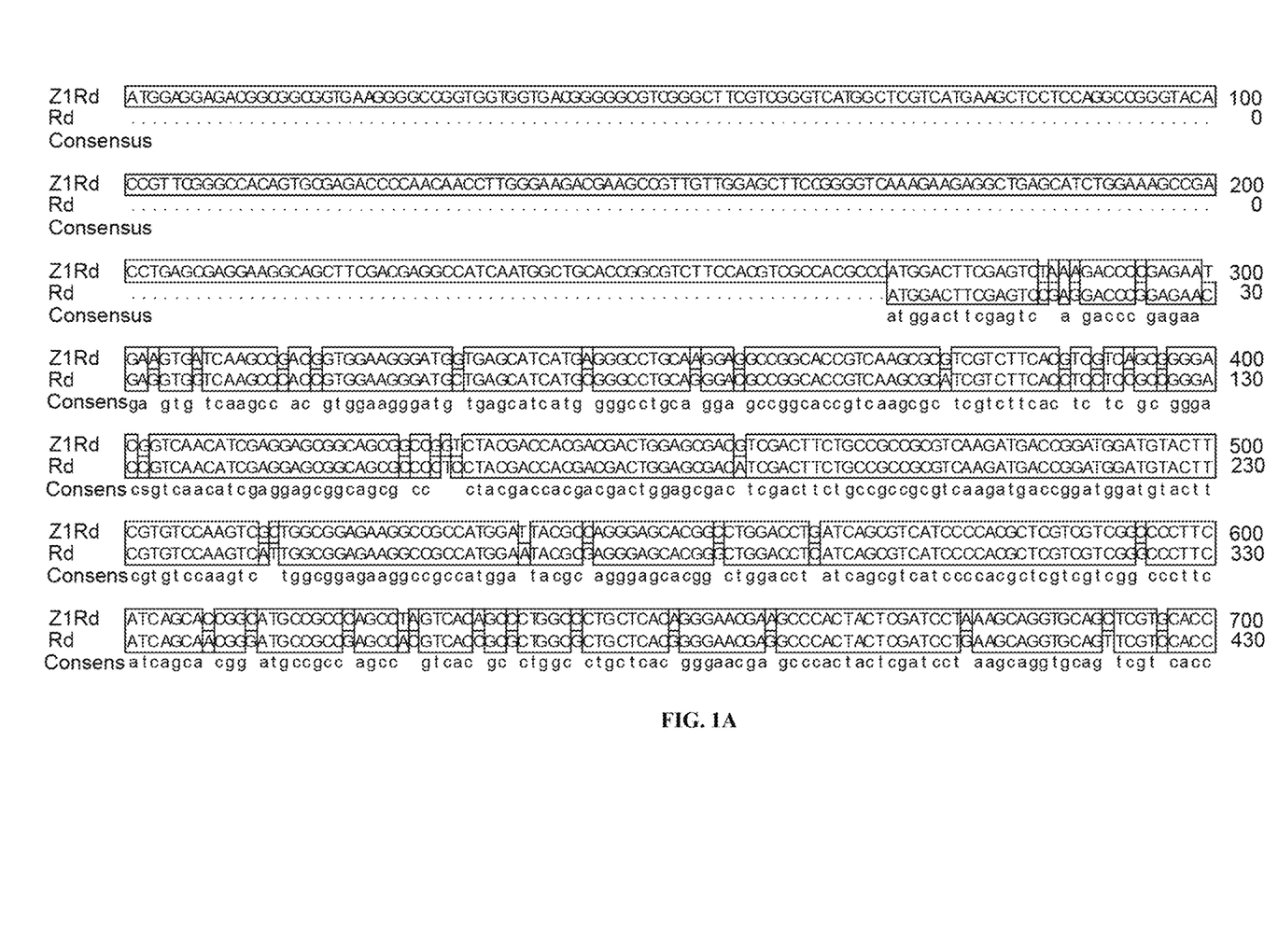
FIGS. 1A-1B show the result of aligning the nucleotide sequence of ZlRd gene with the nucleotide sequence of the homologous gene in rice using ClustalΩ software (publicly available software) in Example 1, where
Figure 1B:
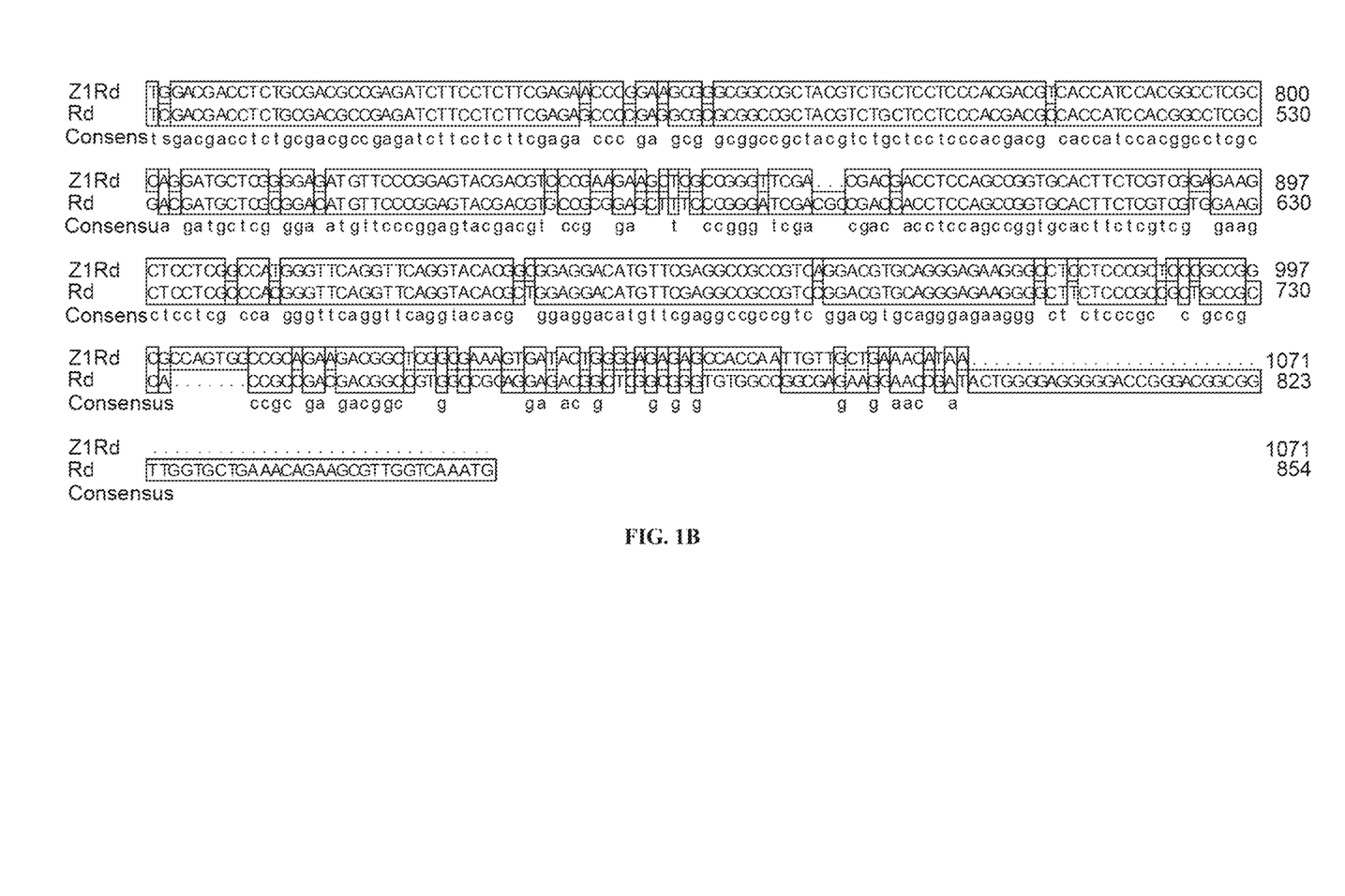
Figure 2:
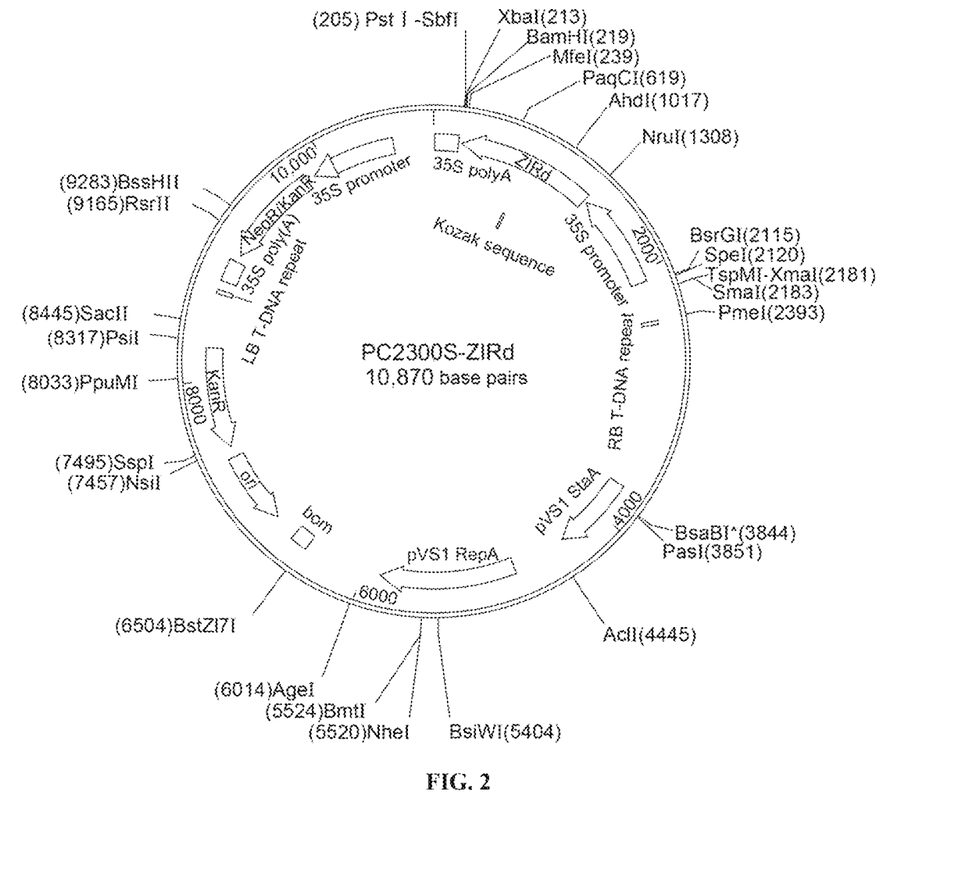
FIG. 2 shows a physical map of the ZlRd overexpression vector in Example 2.

A vector PC2300S was digested with restriction enzymes KpnI and BamHI, obtained digested products were separated by agarose gel electrophoresis, and the linearized PC2300S large fragment was recovered using a gel recovery kit. The fragment was recombined with the PCR amplification product ZlRd, the obtained target gene was connected to the vector, a resulting genetically modified vector was transformed into E. coli competent cells DH5a to obtain the overexpression vector ZLRd (the physical map of the expression vector was shown in FIG. 2).

Figure 3:
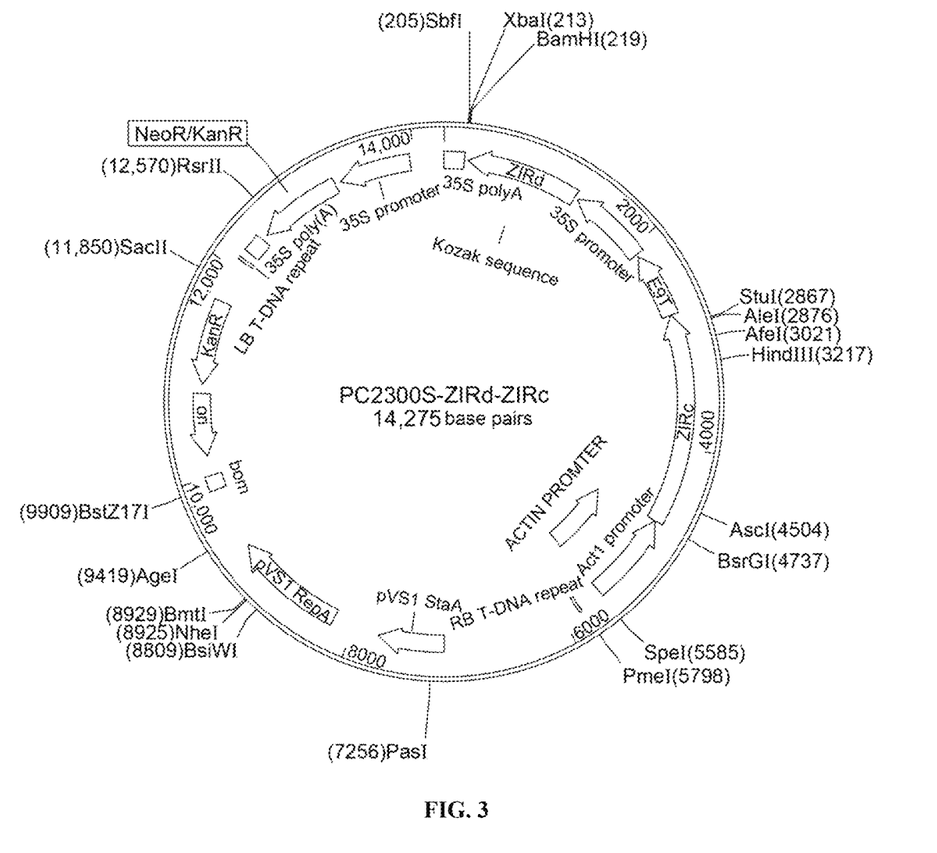
FIG. 3 shows a physical map of the overexpression vector of the pyramid of ZlRc and ZlRd genes in Example 2.

2.2 Construction of Overexpression Vector of the Pyramid of ZlRc and ZlRd Genes The CDS fragment of ZlRc was amplified and constructed into a 322d1-actP-E9T vector linearized with a restriction endonuclease SpeI by homologous recombination; an entire expression frame fragment of actP::ZlRc::E9T was amplified using the obtained intermediate vector 322d1-actP-ZlRc-E9T as a template and constructed into the middle of the HindIII cloning site of the ZlRd overexpression vector to obtain a vector of pyramid of ZlRc and ZlRd genes, where the physical map thereof was shown in FIG. 3.

The obtained ligation product was transformed into E. coli DH5α cells, including: the DH5α cells stored in the −80° C. refrigerator were placed on ice for about 10 min to allow freezing and thawing in an ice bath, 10 µL of the ligation product was added to 100 µL of the DH5α, mixed well by pipetting, and then incubated in ice bath for 30 min; the mixture was subjected to heat shock in a 42° C. water bath for 90 s, and quickly transferred to ice bath for 2 min; 1 mL of an antibiotic-free LB liquid medium was added to the mixture on an ultra-clean workbench, and resuscitation culture was conducted in a shaker at 220 rpm at 37° C. for 45 min to 60 min; a resulting recovered bacterial solution was centrifuged at 6,000 rpm for 5 min, 500 µL of an obtained supernatant was collected using a pipette, 500 µL of the medium was retained to resuspend precipitated bacterial cells, and the resuspended bacterial cells were spread onto a plate to culture upside down in an incubator at 37° C. overnight, and positive clones were picked and cultured overnight on a shaker at 37° C. and 220 rpm.

The PCR primer of the bacterial solution was designed. PCB-seqE: 5'-GCACCCCAGGCTTTACACTT-3' (SEQ ID NO: 7). The primers PCB-seqE (SEQ ID NO: 7) and ZlRd-F: 5'-ATGGAGGAGACGGCGGC-3' (SEQ ID NO: 3) were used for colony PCR to detect ZlRd monoclonal positivity. The primers E9T-340F: 5'-CGTGGCC TCTAATGACCGAA-3' (SEQ ID NO: 8) and 35S-608R: 5'-GTGCGTCATCCCTTACGTCA-3' (SEQ ID NO: 9) were used for colony PCR to detect ZlRc monoclonal positivity. The product of colony PCR was electrophoresed to select positive single colonies with a target band, and then sequenced for verification.

The plasmid was extracted and transformed into Agrobacterium EHA105 competent cells, including the following steps:

(1) The Agrobacterium EHA105 competent cells stored at −80° C. were selected, placed at room temperature or in the palm of hand for a while until they were partially melted, and then inserted into ice when they were in a mixed state of ice/water.

(2) 5 µL of the extracted plasmid was added into per 100 µL of the Agrobacterium-infected EHA105 competent cells, mixed by tapping the bottom of the tube with hand, and then allowed to stand on ice for 5 min, in liquid nitrogen for 5 min, in a 37° C. water bath for 5 min, and in an ice bath for 5 min sequentially.

(3) 700 µL of antibiotic-free LB liquid medium was added to allow culture with shaking at 28° C. for 2 h to 3 h.

(4) The resulting culture product was centrifuged at 6,000 rpm for one minute to collect the bacterial cells, 100 µL of the supernatant was left to resuspend the bacterial cells by gently pipetting, the cells were coated onto an LB plate containing kanamycin, and placed upside down in a 28° C. incubator to allow incubation for 2 d to 3 d.

2.3 Acquisition of ZlRc and ZlRd Gene Pyramid Transgenic Rice (1) Preparation of Callus Step 1. Sterilization of mature rice seeds: The mature rice seeds were shelled with a suitable tool, and seeds with mildew spots and underdeveloped embryos (shrunken, brown) were discarded, while integrity and purity of the seeds were ensured. Hulled rice seeds were washed with 75% ethanol for 1 min, sterilized with 0.15% $HgCl_2$ for 15 min to 20 min, and finally washed 4 to 5 times with sterile dd$H_2O$. The seeds were soaked a final time overnight.

Step 2. Induction of rice callus: The seeds soaked overnight were washed with sterilized water; seed embryos were peeled off along an aleurone layer using a scalpel, and inoculated on an induction medium, where 8 to 12 sterilized rice seeds were inoculated into each bottle of the induction medium; the embryos were cultured at 30° C. in the dark for 40 d to 45 d to induce callus production.

Step 3. Subculture of callus: The light yellow, granular, and dry callus with strong vitality were selected from the induced callus, transferred into the subculture medium, and cultured in the dark for 20 d; during the first subculture, other tissues (such as endosperm, buds) attached to the callus should be removed. The callus that had been subcultured once can be infected with Agrobacterium tumefaciens; the callus used for transformation was subcultured up to two times, since multiple subcultures might easily cause somatic mutations in the callus and reduce transformation efficiency.

Step 4. Pre-culture of callus: The light yellow, granular, and dry callus with strong vitality were selected from the subcultured callus and transferred to pre-cultivation medium, each dish was inoculated with 60 to 80 mung bean-sized callus particles, larger callus particles could be crushed with tweezers and pre-cultured at 28° C. in the dark for 3 d to 4 d. After the pre-culture, callus small particles in well conditions and vigorously dividing state were collected with a spoon into a 250 mL sterile conical flask to allow the Agrobacterium infection.

(2) Preparation of Agrobacterium

Step 1. Activation of Agrobacterium: 2 d before the experiment, an Agrobacterium tumefaciens strain containing the target gene was streaked on an LA plate containing corresponding antibiotics, and then cultured at 28° C. for 2 d.

Step 2. Resuspension of Agrobacterium: The plate streaked with the Agrobacterium tumefaciens was taken out, about one ring of the Agrobacterium was inoculated into 100 mL of a suspension medium using an inoculating loop, 100 µL of an acetosyringone stock solution and 2 mL of 50% glucose were added, and then cultured with shaking at 28° C. and 200 rpm on a constant-temperature shaker for 30 min, such that an obtained Agrobacterium suspension had a concentration of approximately OD600-0.3.

(3) *Agrobacterium* Infection and Liquid Co-Culture

Step 1. *Agrobacterium* infection: The *Agrobacterium* suspension was poured into an Erlenmeyer flask containing the callus until all the callus was submerged, and then allowed to stand for 10 min. The *Agrobacterium* suspension was discarded. A sterilized small flat dish filled with absorbent paper and filter paper was taken, the small flat dish was opened, the Erlenmeyer flask containing the callus was placed upside down on the filter paper of the small flat dish, and as much of the bacterial solution as possible was drained. The callus was spread on filter paper in a sterile large flat dish, covered with a piece of sterilized filter paper, the filter paper was gently pressed with tweezers to absorb the bacterial solution on a surface of the callus, and then the moisture-absorbed filter paper was removed. The filter paper was changed four times in this way, and finally the callus was covered with a piece of filter paper, the large flat dish was covered and then air-dried naturally for 1 h to 2 h.

Step 2. Co-culture: The dried callus particles were transferred to a co-culture medium using tweezers and sealed with a sealing tape. The callus particles were cultured in the dark at 19° C. for 3 d.

Step 3. Washing with water: The co-cultured callus was transferred to a water-washing cup, sterilized distilled water was poured until the callus was completely submerged, the cup was covered to shake for 20 s to 30 s, and the sterilized distilled water was discarded. The water washing was repeated 3 to 4 times. The distilled water in the water-washing cup was observed to see if it was clear: if it was clear, it indicated that the *Agrobacterium* had been basically cleaned, otherwise the water washing was repeated. The sterile distilled water was discarded, sterile distilled water containing 500 mg/L carbenicillin was added, and allowed to stand for 30 min. The sterile distilled water containing 500 mg/L carbenicillin was discarded.

Step 4. Screening of callus: After the callus was dried, the callus particles were transferred to a screening medium using tweezers, sealed with a sealing glue, and placed in a dark culture room to allow screening culture for 20 d (denoted as first screening S1). The dry callus without *Agrobacterium* contamination was transferred from the S1 medium to an S2 medium. The callus was cultured in the dark for 20 d, and it was observed whether fresh and bright yellow resistant callus had grown. If no resistant callus had formed yet, the callus was transferred to new dishes for S3 screening culture. Generally, *japonica* rice varieties could grow resistant callus after being screened twice, that is, in the S2 stage.

Step 5. Differentiation culture: The light yellow, dense, dry and small pieces of resistant callus with strong vitality were selected, where only one small piece of resistant callus was selected from each group, and the callus with *Agrobacterium* was discarded. 3 to 4 small pieces of resistant callus was evenly placed in each bottle of differentiation medium (since callus cells could continue to grow on the differentiation medium, placing them too densely might easily cause different callus pieces to grow together and then become indistinguishable). The callus was cultured at 28° C. for 30 d to 40 d under illumination (16 h light/8 h dark), rooting culture could be started after the seedlings were differentiated and had a height of 3 cm to 5 cm. During the illumination culture, materials contaminating bacterial growth should be cleaned up in time.

Step 6. Rooting of plants: The differentiated seedlings were taken out from the differentiation medium with gun-shaped tweezers and placed in a sterilized empty flat plate, where only one strong seedling was taken from one piece of callus. The seedlings were cleaned with scissors to remove dead or yellowed leaves and roots growing on the differentiation medium. The seedlings were inserted into rooting tubes, with one seedling inserted into each tube. The rooting culture was conducted in a light culture room for 15 d to 20 d, and the seedlings were transplanted after the new roots had grown sufficiently.

Step 7. Transplanting of plants: After uncovering the sealing film of the rooting tube, tap water was added, and seedling hardening was conducted in the light culture room for 3 d to 4 d. During the seedling hardening, leaf samples could be taken for transgenic positive testing. The transformed seedlings were taken out of the rooting tube, attached medium on their roots was washed, and the seedlings were transplanted into a pot or bucket with prepared soil.

(4) Preparation of Reagents and Culture Media Used in Transformation:

1) Abbreviations of Reagents and Solutions:

In the present disclosure, the abbreviations of plant hormones used in the medium were as follows: 6-BenzylaminoPurine (6-BA); Indole-3-acetic acid (IAA); Napthalene acetic acid (NAA); 2,4-Dichlorophenoxyacetic acid (2,4-D); and Kinetin (KT), namely 6-glycosylaminopurine.

2) Formula of Main Solutions:

$MS_{max}$ stock solution (10×): 16.5 g $NH_4NO_3$, 1.7 g $KH_2PO_4$, 19.0 g $KNO_3$, 3.7 g $MgSO_4 \cdot 7H_2O$, and 3.32 g $CaCl_2$) (or 4.4 g $CaCl_2 \cdot 2H_2O$) were dissolved in sequence and diluted to 1,000 mL at room temperature.

$MS_{min}$ stock solution (100×): 2.23 g $MnSO_4 \cdot 4H_2O$, 0.86 g $ZnSO_4 \cdot 7H_2O$, 0.083 g KI, 0.62 g $H_3BO_3$, 0.025 g $Na_2MoO_4 \cdot 2H_2O$, 0.0025 g $CoCl_2 \cdot 6H_2O$, and 0.0025 g $CuSO_4 \cdot 5H_2O$ were dissolved in sequence and diluted to 1,000 mL at room temperature.

$N6_{max}$ stock solution (10×): 28.3 g $KNO_3$, 4.63 g $(NH_4)SO_4$, 4.0 g $KH_2PO_4$, 1.85 g $MgSO_4 \cdot 7H_2O$, and 1.25 g $CaCl_2$) (or 1.66 g $CaCl_2 \cdot 2H_2O$) were dissolved in sequence and diluted to 1,000 mL at room temperature.

$N6_{min}$ stock solution (100×): 0.08 g KI, 0.16 g $H_3BO_3$, 0.15 g $ZnSO_4 \cdot 7H_2O$, and 0.44 g $MnSO_4 \cdot 4H_2O$ (or 0.3335 g $MnSO_4 \cdot H_2O$) were dissolved in sequence and diluted to 1,000 mL at room temperature.

$Fe^{2+}$-EDTA stock solution (100×): about 300 mL $dH_2O$ and 2.78 g $FeSO_4 \cdot 7H_2O$ were added into a reagent bottle to obtain a solution I; about 300 mL $dH_2O$ was added to another reagent bottle, heated to 70° C., and then added with 3.73 g $Na_2 \cdot EDTA \cdot 2H_2O$ to obtain a solution II; after being cooled to room temperature, the solutions in the two bottles were mixed, and then diluted with $dH_2O$ to 1,000 mL, and stored in the dark at 4° C.

Vitamin stock solution (100×): 0.1 g nicotinic acid, 0.1 g nicotine thiamine, 1 g pyridoxine hydrochloride, 10 g myo-inositol, and 0.2 g glycine were mixed and diluted with $dH_2O$ to 1,000 mL, and stored at 4° C.

$AA_{max}$ stock solution (10×): 29.50 g KCl, 2.50 g $MgSO_4 \cdot 7H_2O$, 1.50 g $NaH_2PO_4$, and 1.50 g $CaCl_2 \cdot 2H_2O$ were mixed and diluted with $dH_2O$ to 1,000 mL, and stored at room temperature in the dark.

$AA_{min}$ stock solution (100×): 1.0 g $MnSO_4 \cdot H_2O$, 0.2 g $ZnSO_4 \cdot 7H_2O$, 0.0025 g $CuSO_4 \cdot 5H_2O$, 0.3 g $H_3BO_3$, 0.075 g KI, 0.0025 g $CoCl_2 \cdot 6H_2O$ and 0.025 g $NaMoO_4 \cdot 2H_2O$ were mixed and diluted with $dH_2O$ to 1,000 mL, and stored at room temperature in the dark.

6-BA stock solution (1 mg/mL): 100 mg 6-BA was weighed and added with 1.0 mL 1N KOH, the obtained mixture was shaken until the 6-BA was dissolved, diluted to 100 mL with $dH_2O$ and stored at room temperature.

KT stock solution (1 mg/mL): 100 mg KT was weighed and added with 1.0 mL 1N KOH, the obtained mixture was shaken until the KT was dissolved, diluted to 100 mL with $dH_2O$ and stored at room temperature.

2,4-D stock solution (1 mg/mL): 100 mg 2,4-D was weighed and added with 1.0 mL 1N KOH, the obtained mixture was shaken for 5 min, added with 10 mL $dH_2O$ and shaken until the 2,4-D was dissolved, and diluted to 100 mL with $dH_2O$ and stored at room temperature.

100 mM acetosyringone stock solution: 0.196 g of acetosyringone and 10 mL of dimethyl sulfoxide were mixed and divided into 1.5 mL centrifuge tubes and stored at 4° C.

IAA stock solution (1 mg/mL): 100 mg IAA was weighed and added with 1.0 mL 1N KOH, the obtained mixture was shaken until the IAA was dissolved, diluted to 100 mL with $dH_2O$ and stored at room temperature in the dark.

NAA stock solution (1 mg/mL): 100 mg NAA was weighed and added with 1.0 mL 1N KOH, the obtained mixture was shaken until the NAA was dissolved, diluted to 100 mL with $dH_2O$ and stored at room temperature in the dark.

1 N KOH stock solution: 5.6 g KOH was dissolved in 100 mL $dH_2O$ and stored at room temperature.

0.15% $HgCl_2$: 1.5 g $HgCl_2$ was dissolved with 1 mL of absolute ethanol partially or completely, then diluted to 1,000 mL with $dH_2O$, stirred for 4 h to 8 h, and stored properly at room temperature.

3) Medium Formula for Rice Genetic Transformation:

Induction medium: 100 mL of $N_{6\,max}$ stock solution (10×), 10 mL of $N_{6\,min}$ stock solution (100×), 10 mL of Vitamin stock solution (100×), 10 mL of $Fe^{2+}$-EDTA stock solution (100×), 2.5 mL of 2,4-D stock solution (1 mg/mL), 0.6 g of hydrolyzed casein, 0.3 g of proline, 30 g of sucrose and 3 g of phytagel were mixed and adjusted to a pH value of 5.9, diluted with $dH_2O$ to 1,000 mL.

Subculture medium: 100 mL of $N6_{max}$ stock solution (10×), 10 mL of $N6_{min}$ stock solution (100×), 10 mL of Vitamin stock solution (100×), 10 mL of $Fe^{2+}$-EDTA stock solution (100×), 2.0 mL of 2,4-D stock solution (1 mg/mL), 0.6 g of hydrolyzed casein, 0.5 g of proline, 30 g of sucrose and 3 g of phytagel were mixed and adjusted to a pH value of 5.9, diluted with $dH_2O$ to 1,000 mL.

Pre-culture medium: 12.5 mL of $N6_{max}$ stock solution (10×), 1.25 mL of $N6_{min}$ stock solution (100×), 2.5 mL of Vitamin stock solution (100×), 25 mL of $Fe^{2+}$-EDTA stock solution (100×), 0.75 mL of 2,4-D stock solution (1 mg/mL), 300 μL of acetosyringone stock solution, 5 mL of 50% glucose solution, 0.15 g of hydrolyzed casein, 5 g of sucrose and 1.75 g of agarose were mixed and adjusted to a pH value of 5.4, added with $dH_2O$ to 250 mL.

Co-culture medium: 12.5 mL of $N6_{max}$ stock solution (10×), 1.25 mL of $N6_{min}$ stock solution (100×), 2.5 mL of Vitamin stock solution (100×), 25 mL of $Fe^{2+}$-EDTA stock solution (100×), 0.75 mL of 2,4-D stock solution (1 mg/mL), 300 μL of acetosyringone stock solution, 5 mL of 50% glucose solution, 0.2 g of hydrolyzed casein, 5 g of sucrose and 1.75 g of agarose were mixed and adjusted to a pH value of 5.4, added with $dH_2O$ to 250 mL.

Suspension medium: 5 mL of $N6_{max}$ stock solution (10×), 0.5 mL of $N6_{min}$ stock solution (100×), 1 mL of Vitamin stock solution (100×), 0.5 mL of $Fe^{2+}$-EDTA stock solution (100×), 0.2 mL of 2,4-D stock solution (1 mg/mL), 100 μL of acetosyringone stock solution, 2 mL of 50% glucose solution, 0.08 g of hydrolyzed casein and 2 g of sucrose were mixed and adjusted to a pH value of 5.4, added with $dH_2O$ to 100 mL.

Screening medium: 25 mL of $N6_{max}$ stock solution (10×), 2.5 mL of $N6_{min}$ stock solution (100×), 2.5 mL of Vitamin stock solution (100×), 2.5 mL of $Fe^{2+}$-EDTA stock solution (100×), 0.625 mL of 2,4-D stock solution (1 mg/mL), 400 μL of 400 mg/L carbenicillin, 250 μL of 50 mg/L hygromycin B, 5 mL of 50% glucose solution, 0.15 g of hydrolyzed casein, 7.5 g of sucrose and 1.75 g of agarose were mixed and adjusted to a pH value of 6.0, added with $dH_2O$ to 250 mL.

Differentiation medium: 100 mL of $MS_{max}$ stock solution (10×), 10 mL of $MS_{min}$ stock solution (100×), 10 mL of Vitamin stock solution (100×), 10 mL of $Fe^{2+}$-EDTA stock solution (100×), 2.0 mL of 6-BA, 2.0 mL of KT, 0.2 mL of IAA, 0.2 mL of NAA, 30 g of sucrose, 1 g of hydrolyzed casein and 3 g of phytagel were mixed and adjusted to a pH value of 6.0, added with $dH_2O$ to 1,000 mL.

Rooting medium: 50 mL of $MS_{max}$ stock solution (10×), 5 mL of $MS_{min}$ stock solution (100×), 10 mL of Vitamin stock solution (100×), 10 mL $Fe^{2+}$-EDTA stock solution (100×), 20 g of sucrose and 3 g of phytagel were mixed and adjusted to a pH value of 5.8, added with $dH_2O$ to 1,000 mL.

2.4 Identification of Overexpression Plants

The leaves of the transformed plants were cut, DNA was extracted using a CTAB method, and PCR detection was conducted using specific primers for screening marker genes. Specific operations were as follows:

(1) 1 g to 2 g of freshly transformed rice leaves were placed into a mortar pre-cooled with liquid nitrogen, added with liquid nitrogen and ground to obtain a powder, the powder was transferred to a 2 mL centrifuge tube. (2) 600 μL of CTAB separation buffer was added into the powder, the centrifuge tube was inverted up and down to mix evenly, placed in a 65° C. water bath and kept for 30 min, with shaking gently every 3 min to 4 min to mix well. (3) An equal volume solution composed of chloroform and isoamyl alcohol with a volume ratio of 24:1 was added into the centrifuge tube, the centrifuge tube was inverted up and down to mix evenly, centrifuged at 12,000 rpm for 15 min, and a supernatant was transferred to a new 1.5 mL centrifuge tube. (4) 0.6 folds volume of isopropyl alcohol was added, mixed gently, placed at −20° C. to precipitate DNA for 1 h, centrifuged at 12,000 rpm for 15 min, and a supernatant was discarded. (5) 700 μL of 70% ethanol was added to wash the DNA pellet, the centrifuge tube was inverted up and down to mix evenly, centrifuged at 12,000 rpm for 5 min, a supernatant was discarded, and the DNA pellet was placed in a clean bench to dry naturally. (6) The DNA was dissolved in $ddH^2O$ and store at −20° C. for later use.

Figure 4:
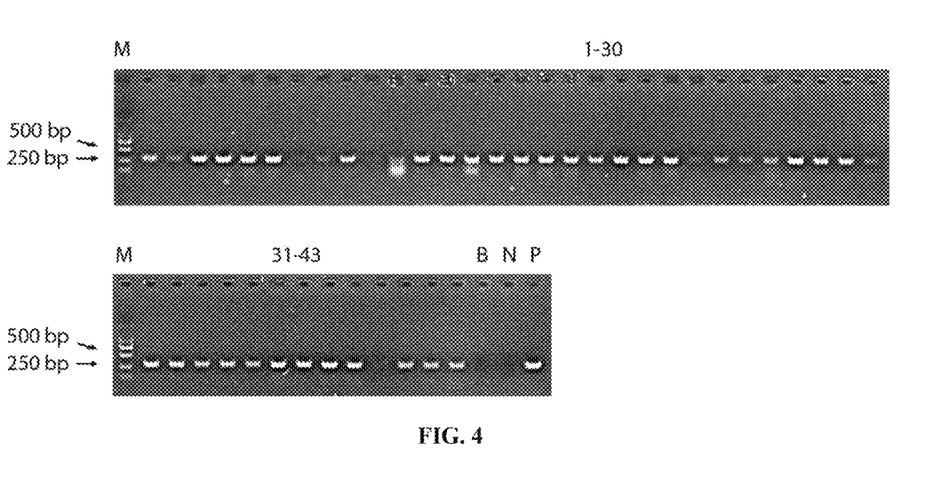
FIG. 4 shows an agarose gel electrophoresis image of the identification of the transgenic rice positive plant in Example 2; where M represents the DL2000 marker, B represents the blank control, N represents the negative control, and P represents the positive control.

The positive identification primers for overexpression vector transformation across promoters were designed, including NPTII-F68: 5'-ACTGGGCACAACAGACA ATCG-3' (SEQ ID NO: 10), and NPTII-R356: 5'-GC ATCAGCCATGATGGATACTTT-3' (SEQ ID NO: 11). The agarose gel electrophoresis image was shown in FIG. 4.

2.5 Detection of ZlRc and ZlRd Genes

Figure 5A:
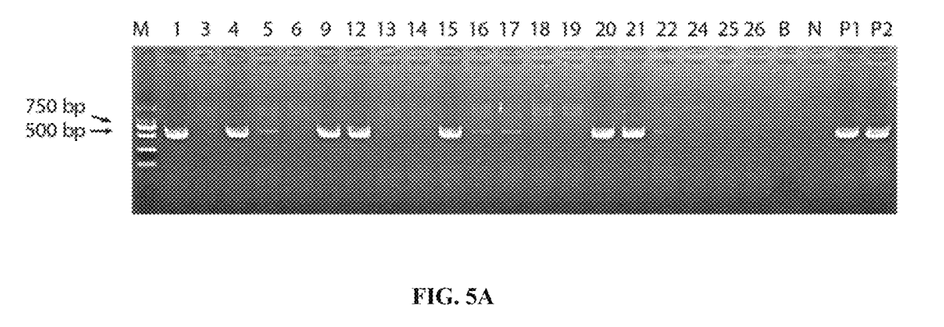
FIG. 5A shows the electrophoresis detection result of the PCR product of the target gene ZlRc.

Detection primers were designed according to the target gene ZlRc (ZlRc-584 bpF: GAAACAGA GAACGACGACGA (SEQ ID NO: 12); ZlRc-584bpR: GGTGTTTGGGCTTCCTTGTA (SEQ ID NO: 13)), and the amplification reaction system (10 μL) was as follows: 2×PCR Mix 5 μL, Primer F 0.2 μL, Primer R 0.2 μL, $ddH_2O$ 4.1 μL, and DNA template 0.5 μL. Reaction procedure: 95° C. for 3 min, 32 cycles (95° C. for 10 s, 56° C. for 10 s, and 72° C. for 10 s), 72° C. for 2 min, and 25° C. for 1 min. The PCR amplification products were detected by 1% agarose gel electrophoresis. The PCR amplification product of the target gene ZlRc was detected by agarose gel electrophoresis, and the results were shown in FIG. 5A. The samples numbered 1, 4, 9, 12, 15, 20, and 21 were detected positive for the target gene ZlRc.

Figure 5B:
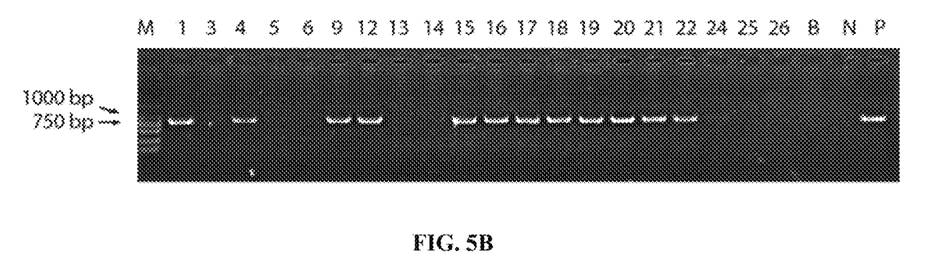
FIG. 5B shows the electrophoresis detection result of the PCR product of the target gene ZlRd, and M represents the DL2000 marker, B represents the blank control, N represents the negative control, and P1, P2, and P each represent the positive control.

Detection primers were designed according to the target gene ZlRd (pCB-35SF: ATCCCACTATCCTTCGCAAGA (SEQ ID NO: 14); ZlRd-676R: GGATCGA GTAGTGGGCTTCG (SEQ ID NO: 15)), and the reaction system (10 μL) for amplifying 23OSGO9 was as follows: 2×PCR Mix 5 μL, Primer F 0.2 μL, Primer R 0.2 μL, ddH$_2$O 4.1 μL, and DNA template 0.5 μL. Reaction procedure: 95° C. for 3 min, 32 cycles (95° C. for 10 s, 56° C. for 10 s, and 72° C. for 10 s), 72° C. for 2 min, and 25° C. for 1 min. The PCR amplification products were detected by 1% agarose gel electrophoresis. The PCR amplification product of the target gene ZlRd was detected by agarose gel electrophoresis, and the results were shown in FIG. 5B. The samples numbered 1, 4, 9, 12, 15, 16, 17, 18, 19, 20, 21, and 22 were detected positive for the target gene ZlRd.

Figure 6A:
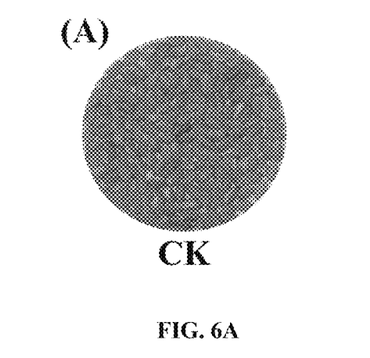
Figure 6B:
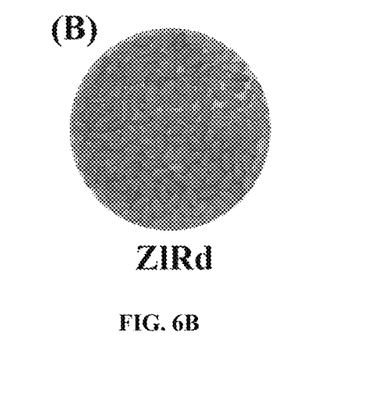
FIG. 6B shows the seeds of rice cultured after control rice seeds are transfected with the ZlRd gene.
Figure 6C:
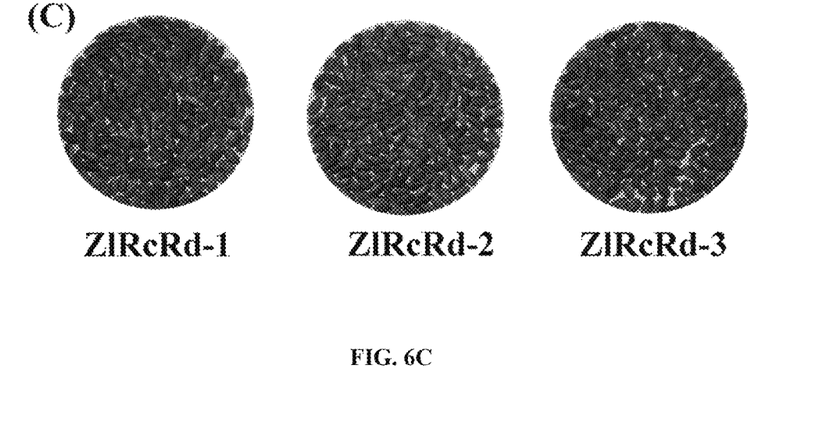
FIG. 6C shows the seeds of rice cultured after control rice seeds are transfected with the ZlRc and ZlRd genes.

Example 3 Phenotypic Observation of Seeds of Transgenic Rice Expressing Single ZlRd Gene (ZlRd), and Pyramid of ZlRc and ZlRd Genes (ZlRcRd), and Control Rice ZlRd single gene (ZlRd) and pyramid of ZlRc and ZlRd gene (ZlRcRd) transgenic rice and control rice (CK) were cultured in a greenhouse under same growth conditions such as culture medium and culture temperature. The materials were grown under normal water and fertilizer conditions to normal firmness and ripeness. The grains and ears were separated and air-dried, and the chaff of the grains was removed manually. After removing the chaff from the grains, the seed coat color of ZlRd transgenic rice seeds and the control rice seeds were similar, and both seeds were colorless. However, ZlRcRd-transgenic rice seeds showed significant differences in seed coat color compared to control rice seeds. As shown in FIGS. 6A-6C, the seeds of the ZlRcRd-transgenic rice plants were dark brown.

Example 4 Determination of Total Phenol, Total Flavone, and Total Proanthocyanidin Contents in Seeds of ZlRd and ZlRcRd Transgenic Rice and Control Rice The seeds of the ZlRc and ZlRd transgenic rice and the seeds of the control group obtained after hulling the grains were freeze-dried to a constant weight, ground into powders, and then passed through a 100-mesh sieve.

The extraction method of total phenolic compounds in seeds, and the detection method of total phenol, total flavone, and total proanthocyanidin contents of seeds were derived from the article titled "Comparison of the contents of phenolic compounds including flavonoids and antioxidant activity of rice (*Oryza sativa*) and Chinese wild rice (*Zizania latifolia*)".

(1) Extraction of Total Phenolic Compounds in Seeds 0.2 g of the seed powder of the ZlRc and ZlRd transgenic rice and the control group (accuracy was 0.0001) were respectively weighed and added with 5 mL of methanol, and ultrasonic extraction was conducted at 50° C. for 80 min. The mixture was centrifuged in a low-speed centrifuge at 4° C. and 3,000 rpm for 10 min. A supernatant was passed through a 0.22 μm polar filter to obtain a free phenolic extract. 5 mL of 4 mol/L NaOH solution was added to the remaining filter residue, and hydrolyzed in a constant-temperature oscillator at 30° C. and 220 r/min for 4 h. The resulting mixture was centrifuged at 4° C. and 3,000 rpm for 10 min, and a supernatant was collected into a 40 mL glass centrifuge tube. The supernatant was adjusted to a pH value of 1.5 to 2.0 with 6 mol/L HCl, and an obtained bound phenol was extracted three times with 30 mL of ethyl acetate. The ethyl acetate mixture obtained 3 times was rotary-evaporated to dryness at 35° C. on a rotary evaporator, then 5 mL of methanol was added for ultrasonic reconstitution, the obtained product was passed through a 0.22 μm polar filter to obtain the bound phenol extract, and stored at 4° C. During measurement, equal amounts (1 mL) of free phenol and bound phenol extract were mixed to obtain a total phenolic compound solution.

(2) Determination of Total Phenolic Content in Seeds

The total phenolic content was measured using a FoLin-Ciocalteu colorimetric method. 250 μL of the sample solution was added to 250 μL of a triple-diluted FoLin-Ciocalteu solution, mixed well, and reacted at room temperature for 5 min; 1 mL of ultrapure water and 250 μL of 20% Na$_2$CO$_3$ were added into the reaction system, mixed thoroughly, reacted in the dark for 30 min, and centrifuged at 4° C. and 3,000 r/min for 10 min. 200 mL of the resulting supernatant was placed in a 96-well plate, and its absorbance at 725 nm was measured in a microplate reader. Each sample was measured 3 times. Anhydrous methanol was used as a blank control and gallic acid (GA) was used as a standard to establish a standard curve. The total phenolic content in each sample was expressed as milligrams of equivalent gallic acid per 100 g of rice seed powder (mg GAE/100 g).

(3) Determination of Total Flavone Content in Seeds

Reactions were conducted in a 96-well plate. 50 μL of sample extract solution was added into 10 μL of 5% NaNO$_2$ aqueous solution, mixed well, and reacted at room temperature for 5 min. 10 μL of 10% AlCl$_3$ aqueous solution was added, mixed well, and reacted at room temperature for 1 min. 100 μL of 0.5 M NaOH solution was added, reacted for 10 min, and it absorbance was measured at 510 nm. Each sample was measured 3 times. Anhydrous methanol was used as a blank control and catechin (C) was used as a standard to establish a standard curve. The total flavone content in each sample was expressed as milligrams of equivalent catechin per 100 g of rice seed powder (mg CE/100 g).

(4) Determination of Total Proanthocyanidin Content in Seeds

Reactions were conducted in a 96-well plate. 20 μL of sample was added into 100 μL of vanillin methanol solution (30 g/mL, W/V), 100 μL of sulfuric acid methanol solution (30% concentrated sulfuric acid, V/V) was added, reacted at room temperature in the dark for 5 min, and the absorbance was measured at 500 nm with an enzyme reader. Each sample was measured 3 times. Anhydrous methanol was used as a blank control and catechin (C) was used as a standard to establish a standard curve. The total phenolic content in each sample was expressed as milligrams of equivalent catechin per 100 g of rice seed powder (mg CE/100 g).

Figure 7:
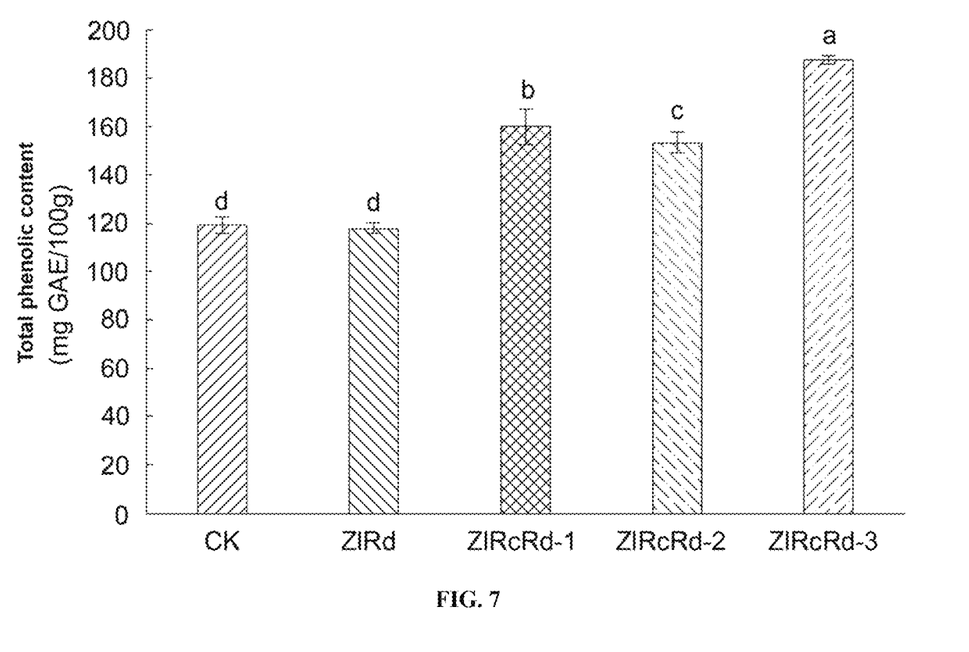
FIG. 7 shows comparison results of total phenolic content in transgenic rice seeds of 1 control (CK), 1 ZlRd single gene (ZlRd), and 3 pyramids of ZlRc and ZlRd genes (ZlRcRd-1, ZlRcRd-2, ZlRcRd-3) of Example 4, where test results are the mean of three replicates, and error bars represent the standard deviation (SD)
Figure 8:
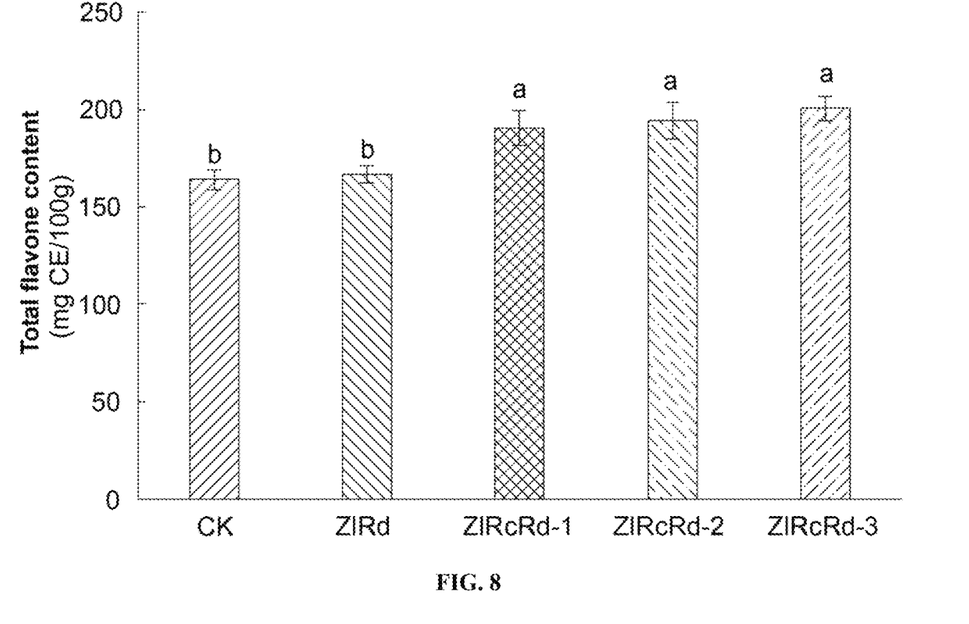
FIG. 8 shows comparison results of total flavone content in transgenic rice seeds of 1 control (CK), 1 ZlRd single gene (ZlRd), and 3 pyramids of ZlRc and ZlRd genes (ZlRcRd-1, ZlRcRd-2, ZlRcRd-3) of Example 4, where test results are the mean of three replicates, and error bars represent the standard deviation (SD)
Figure 9:
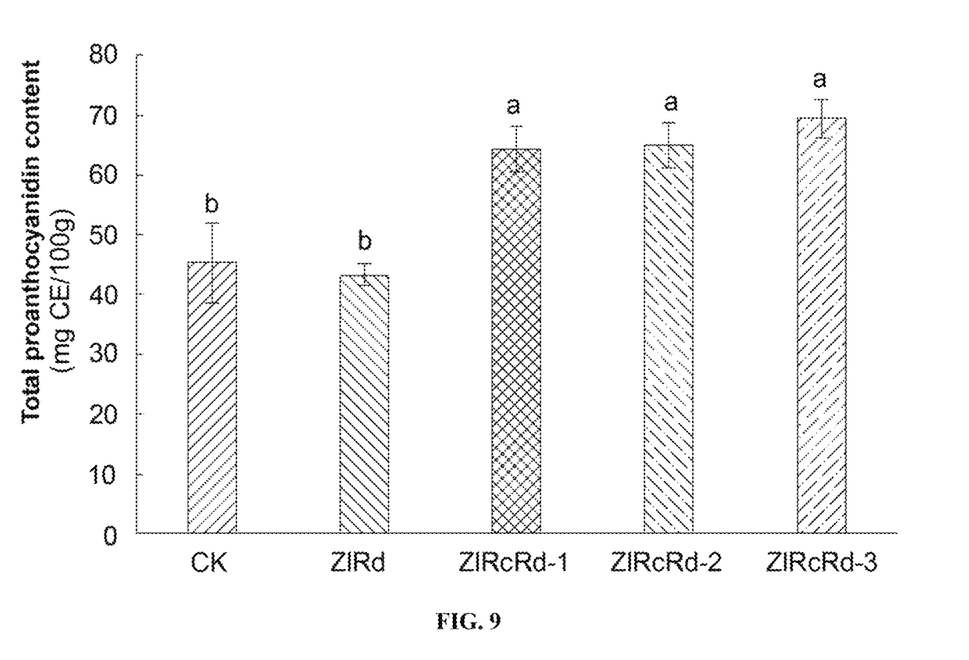
FIG. 9 shows comparison results of total proanthocyanidin content in transgenic rice seeds of 1 control (CK), 1 ZlRd single gene (ZlRd), and 3 pyramids of ZlRc and ZlRd genes (ZlRcRd-1, ZlRcRd-2, ZlRcRd-3) of Example 4, where test results are the mean of three replicates, and error bars represent the standard deviation (SD)

The detection results were shown in FIG. 7 to FIG. 9. The total phenolic content, total flavone content, and total proanthocyanidin content of ZlRd-transgenic rice seeds were not significantly different from those of the control rice seeds. However, the total phenolic content, total flavone content, and total proanthocyanidin content of ZlRcRd-transgenic rice seeds were significantly higher than those of the control rice seeds. Among them, the ZlRd-transgenic rice corresponded to the positive plant number 16 in Example 2; while the ZlRcRd-transgenic rice ZlRcRd-1, ZlRcRd-2, and ZlRcRd-3 corresponded to the positive plant number 1, 4, and 9 in Example 2, respectively. The total phenolic content, total flavone, and total proanthocyanidin contents of ZlRcRd-transgenic rice seeds were 1.40 times, 1.19 times, and 1.46 times that of the control rice seeds, respectively.

Example 5 Determination of DPPH Free Radical Scavenging Capacity and ABTS$\cdot^+$ Free Radical Absorption Capacity in Seeds of ZlRd and ZlRcRd Transgenic Rice and Control Rice The detection methods of DPPH free radical scavenging capacity and ABTS$\cdot^+$ free radical absorbing capacity of seeds were derived from the article titled "Comparison of the contents of phenolic compounds including flavonoids and antioxidant activity of rice (*Oryza sativa*) and Chinese wild rice (*Zizania latifolia*)".

(1) Determination of DPPH Free Radical Scavenging Capacity

The reaction was conducted in a 96-well plate, and 50 μL of sample was added into 150 μL of 0.5 mM DPPH methanol solution. A resulting mixture was reacted in the dark at 30° C. for 30 min, and its absorbance at 517 nm was measured using a microplate reader. Methanol was used as a blank control, and a methanol solution of vitamin E was used as a standard. The measurement was repeated 3 times for each sample, and the DPPH free radical scavenging capacity was expressed as the equivalent vitamin micromoles of 100 g of rice seed powder (umol TE/100 g).

(2) Determination of ABTS$\cdot^+$ Free Radical Absorption Capacity

The equal amounts of 1.1 mg/mL ABTS methanol solution and 0.68 mg/mL potassium persulfate aqueous solution were mixed, a resulting mixture was allowed to stand in a dark room overnight to obtain an ABTS$\cdot^+$ reagent, which was diluted with methanol and adjusted to absorbance of 0.700±0.020. The reaction was conducted in a 96-well plate, and 50 μL of sample was added into 150 μL of ABTS$\cdot^+$ solution. A resulting mixture was reacted in the dark at 30° C. for 30 min, and its absorbance at 734 nm was measured using a microplate reader. Methanol was used as a blank control, and a methanol solution of vitamin E was used as a standard. The measurement was repeated 3 times for each sample, and the ABTS$\cdot^+$ free radical absorbing capacity was expressed as the equivalent vitamin micromoles of 100 g of rice seed powder (μmol TE/100 g).

Figure 10:
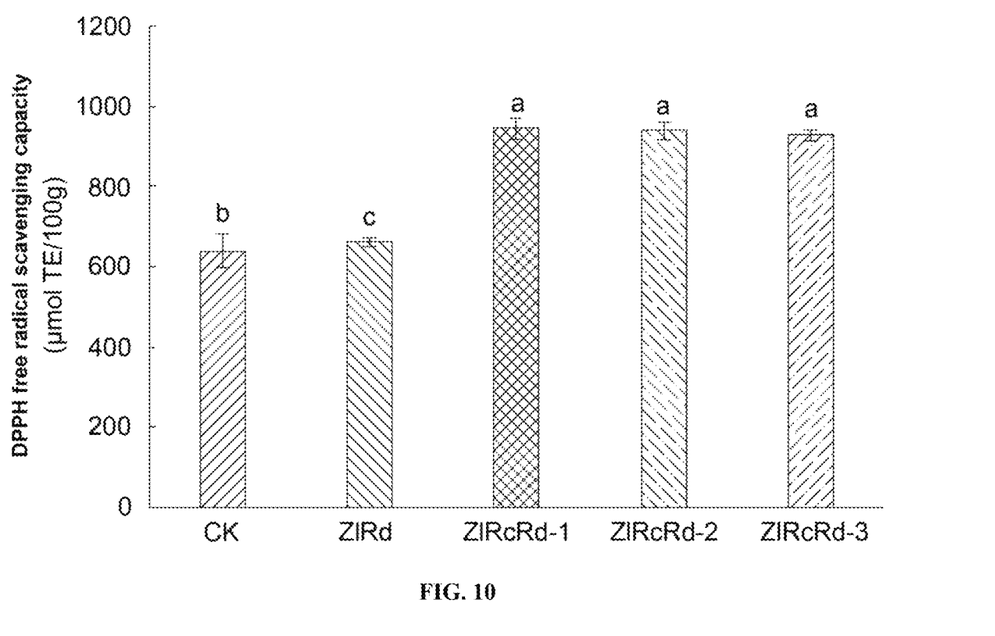
FIG. 10 shows comparison results of DPPH free radical scavenging capacity in transgenic rice seeds of 1 control (CK), 1 ZlRd single gene (ZlRd), and 3 pyramids of ZlRc and ZlRd genes (ZlRcRd-1, ZlRcRd-2, ZlRcRd-3) of Example 5, where test results are the mean of three replicates, and error bars represent the standard deviation (SD)
Figure 11:
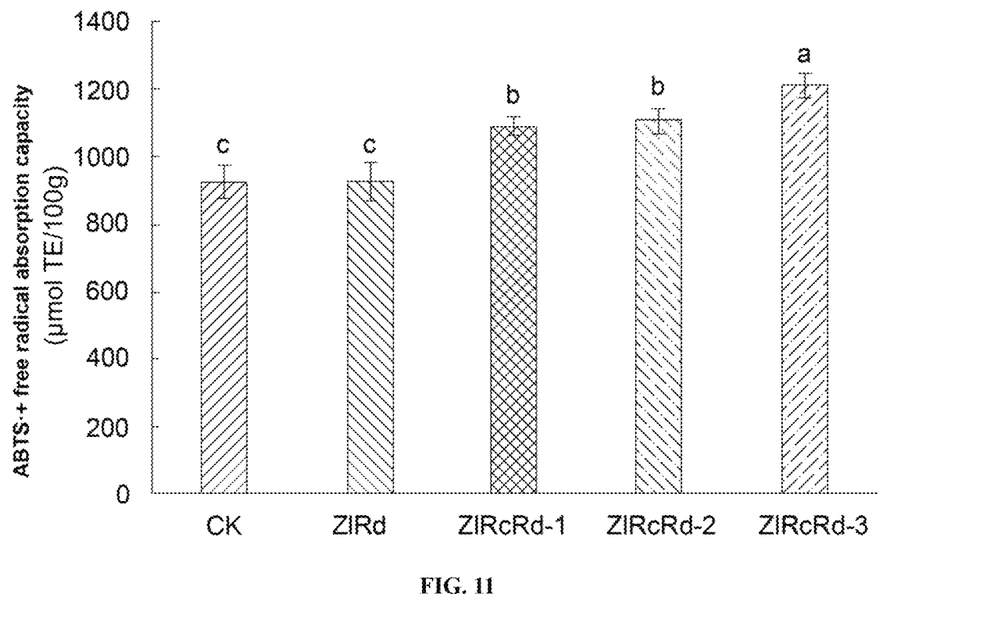
FIG. 11 shows comparison results of ABTS$\cdot^+$ free radical absorption capacity in transgenic rice seeds of 1 control (CK), 1 ZlRd single gene (ZlRd), and 3 pyramids of ZlRc and ZlRd genes (ZlRcRd-1, ZlRcRd-2, ZlRcRd-3) of Example 5, where test results are the mean of three replicates, and error bars represent the standard deviation (SD).

The test results were shown in FIG. 10 and FIG. 11. It can be seen from these results that the DPPH free radical scavenging capacity and ABTS$\cdot^+$ free radical absorption capacity of ZlRd-transgenic rice seeds were not significantly different from those of the control rice seeds. However, the DPPH free radical scavenging capacity and ABTS$\cdot^+$ free radical absorption capacity of ZlRcRd-transgenic rice seeds were significantly higher than those of the control rice seeds. The DPPH free radical scavenging capacity and ABTS$\cdot^+$ free radical absorbing capacity of ZlRcRd-transgenic rice seeds were on average 1.47 times and 1.23 times those of the control rice seeds, respectively.

In the present disclosure, the total phenolic content, total flavone content, and total proanthocyanidin content of the transgenic rice seeds of pyramid of ZlRc and ZlRd were significantly higher than those of the control rice seeds. Moreover, their DPPH free radical scavenging capacity and ABTS$\cdot^+$ free radical absorbing capacity were significantly higher than those of control rice seeds. The pyramid of ZlRc and ZlRd genes showed significant effect on increasing the total phenolic content compared to control rice seeds, which indicated that the overexpression of the pyramid of ZlRc and ZlRd genes in rice showed an effective regulatory effect on the synthesis pathway of polyphenol compounds, effectively increasing the polyphenol content in rice seeds.

The above description is only preferred examples of the present disclosure, and is not intended to limit the present disclosure. Although the present disclosure is expounded with reference to the above examples, a person skilled in the art can still make modifications on the technical solution described in the above examples or equivalent substitutions on some technical features of the technical solution. Any modification, equivalent substitution, improvement, etc. within the spirit and principles of the present disclosure shall fall within the scope of protection of the present disclosure.

What is claimed is:

1. A method for increasing a polyphenol content of a rice seed, comprising transferring a constructed overexpression vector comprising ZlRc and ZlRd genes into rice to obtain a transgenic rice plant that overexpresses the ZlRc and ZlRd genes simultaneously, wherein the nucleotide sequence of ZlRd gene is set forth in SEQ ID NO: 1 and the nucleotide sequence of ZlRc gene is set forth in SEQ ID NO: 2.

2. The method according to claim 1, wherein a protein encoded by ZlRd gene has the amino acid sequence set forth in SEQ ID NO: 5; and a protein encoded by ZlRc gene has the amino acid sequence set forth in SEQ ID NO: 6.

3. The method according to claim 1, comprising the steps of constructing sequences of ZlRc and ZlRd genes on the overexpression vector in sequence, transferring the overexpression vector into the rice, and obtaining the transgenic rice plant with a significantly increased polyphenol content in a seed by increasing expression levels of mRNAs of ZlRc and ZlRd genes.

4. The method according to claim 3, comprising the steps of transferring the overexpression vector into an *Agrobacterium* strain through chemical transformation, obtaining an independent transformant by infecting a callus with the *Agrobacterium* strain, and plant regenerating the independent transformant to obtain the transgenic rice plant.

* * * * *

SEQUENCE LISTING

```
Sequence total quantity: 16
SEQ ID NO: 1            moltype = DNA  length = 1071
FEATURE                 Location/Qualifiers
source                  1..1071
                        mol_type = other DNA
                        organism = synthetic construct
SEQUENCE: 1
atggaggaga cggcggcggt gaaggggccg gtggtggtga cggggcgtc  gggcttcgtc   60
gggtcatggc tcgtcatgaa gctcctccag gccgggtaca ccgttcgggc cacagtgcga  120
gacccaaca accttgggaa gacgaagccg ttgttggagc ttccggggtc aaagaagagg  180
ctgagcatct ggaaagccga cctgagcgag gaaggcagct tcgacgaggc catcaatggc  240
tgcaccggcg tcttccacgt cgccacgccc atggacttcg agtctaaaga ccccgagaat  300
gaagtgatca agccgacggt ggaagggatg gtgagcatca tgaggcctg  caaggaggcc  360
ggcaccgtca agcgcgtcgt cttcacgtcg tcagcgggga cggtcaacat cgaggagcgg  420
cagcggccgg tctacgacca cgacgactgg agcgacgtcg acttctgccg ccgcgtcaag  480
atgaccggat ggatgtactt cgtgtccaag tcgctggcgg agaaggccgc catggattac  540
gccagggagc acggcctgga cctgatcagc gtcatcccca cgctcgtcgt cggccccttc  600
atcagcaccg gcatgccgcc cagcctagtc acagccctgg ccctgctcac agggaacgaa  660
gcccactact cgatcctaaa gcaggtgcag ctcgtgcacc tggacgacct ctgcgacgcc  720
gagatcttcc tcttcgagaa cccggaagcg ggcggccgct acgtctgctc ctcccacgac  780
gtcaccatcc acggcctcgc caggatgctc ggggagatgt tcccggagta cgacgtcccg  840
aagaagctcg ccgggttcga cgacgacctc cagccggtgc acttctcgtc ggagaagctc  900
ctcggccatg ggttcaggtt caggtacacg gcggaggaca tgttcgaggc cgccgtcagg  960
acgtgcaggg agaagggcct cctcccgctc ccgccgcgc  cagtggccgc agaagacggc 1020
tcggcgaaag tgatactggg gagagagcca ccaattgttg ctgaaacata a           1071

SEQ ID NO: 2            moltype = DNA  length = 1971
```

```
FEATURE                 Location/Qualifiers
source                  1..1971
                        mol_type = other DNA
                        organism = synthetic construct
SEQUENCE: 2
atgcacgcca tggccggcgg cgaggctcag gtggcgctgc aggcggtggc gcagggcctc      60
cgctggacgt acagcctcct ctggtacctc tgccggcacc aagggaccgc gctggtgtgg    120
gcggaggggc actacaacgg tgccgtcaag acgcgcaaga cggtgcagcc tccggcggcg    180
gtggcggcgg gggcggagga ggactctgcc gaccacgcgg cgccgccacag gagccggcag    240
ctgcgggagc tctacgactg gctggcgggg gaggcagccg ccgctggcgg aggcgccgaa    300
ggaacagcaa cggggagcgg cggcggcgtg caggcggccg cgagctgcag gcgcccgagc    360
gcggcgctgt cgccggagga cctgacggag accgagtggt tcttcctcat gtcggcctcc    420
tactccttcc cttccggcgt cgggttacct ggaagggcat ttgcaagggg aaggcatgta    480
tggctcactg gagcaaatga agttgacagc aaagtatttc taagagcaat ccttgcaaag    540
acagtcgtgt gtattcctat cgtcgatggt gtcctggaaa tcgaactac agaaaaggtg    600
gaggaagatg cagggttagt tcagtatgca aggagcatct tcatggatca ccatggcata    660
cacatgaagc tacccctctc tgaacattca acatccaacc cggtagcaca catggatcaa    720
cagtcaaagc aggtgcagat gcagaaatgc ccggcctgga cagatgga ttcagatgag    780
ctcaatccag aagacgagga cgacgaaaca gagaacgacg acgagggctt atcaggttca    840
gaaacttatt acactgacac tgtcaggaac tcgagccagg tgcaaccccc actgaacatg    900
gtgagcaatg gccggacaac gccaaatgta ggtaccagtg aactaatgca gtgtgacatg    960
tcagaggttg tgagagatgg ctgctcaaac aatctgaaga aggaaatcca aatgctgatg   1020
gactgccaaa atagtaatgg ccagttcaat ttgcaggggc ctgatgagcc ctgtcactct   1080
tggcattttc tttatgaaga gctaaatggt tgcctgccag gtgcagaaga tcaagtgaca   1140
tcacctgaaa attcccacta cccacaaacg ctcttgacaa tcctacagtt caatgcgcgg   1200
cgacaaacag aattaaacat caagaactac ctgccagttt cagagaaatc atcattctcc   1260
agatggaacc ataaaggaat tgctgataat cagggcatga tcacacaagg caccccacag   1320
agaatgctca ggagtatcct gatgaatgct cccagtagtc actgcagcta caaggaagcc   1380
caaacaccca atcaagggg cgggaaaggc gcaaatgggt tgcgcaaaat cggcactgtc   1440
caaggggatt tcagtgctaa tcatgtgctg aaagaaagaa aaagaagaga aagcttaat   1500
gagaagttca taattctgag atcttttgtg cctttcatga caaagatgga caagacctca   1560
atacttggtg acacgatcga gtacgtgaag cagttaagga agcgcataca ggacctcgag   1620
tcacgagctc ggccgcgac cacgacggcc aggaagcgga ggggcgcgc ggcggaaggc    1680
agcagcagca gcgctgccgc cgtcgccggc ggcgaaacgg aggtgcaggt gtccatcatc   1740
gagagcgacg cgctgctgga gctgcggtgc ggttgccggg acggtctgct gctccgggtg   1800
atgcaggcgc tgcaggagct ccagctcgag gtcaccgccg tgcaggcctc gtcggccgac   1860
ggcgtgttgg tcgccgagct ccgcgccaag gtgaaggagg cgcgcgggag gaggaagagc   1920
agcatttctc aggtgaagag ggcaatccat cttgtcctct cctcaccatg a            1971

SEQ ID NO: 3            moltype = DNA  length = 17
FEATURE                 Location/Qualifiers
source                  1..17
                        mol_type = other DNA
                        organism = synthetic construct
SEQUENCE: 3
atggaggaga cggcggc                                                    17

SEQ ID NO: 4            moltype = DNA  length = 26
FEATURE                 Location/Qualifiers
source                  1..26
                        mol_type = other DNA
                        organism = synthetic construct
SEQUENCE: 4
ttatgtttca gcaacaattg gtggct                                          26

SEQ ID NO: 5            moltype = AA  length = 356
FEATURE                 Location/Qualifiers
source                  1..356
                        mol_type = protein
                        organism = synthetic construct
SEQUENCE: 5
MEETAAVKGP VVVTGASGFV GSWLVMKLLQ AGYTVRATVR DPNNLGKTKP LLELPGSKKR     60
LSIWKADLSE EGSFDEAING CTGVFHVATP MDFESKDPEN EVIKPTVEGM VSIMRACKEA    120
GTVKRVVFTS SAGTVNIEER QRPVYDHDDW SDVDFCRRVK MTGWMYFVSK SLAEKAAMDY    180
AREHGLDLIS VIPTLVVGPF ISTGMPPSLV TALALLTGNE AHYSILKQVQ LVHLDDLCDA    240
EIFLFENPEA GGRYVCSSHD VTIHGLARML GEMFPEYDVP KKLAGFDDDL QPVHFSSEKL    300
LGHGFRFRYT AEDMFEAAVR TCREKGLLPL PPAPVAAEDG SAKVILGREP PIVAET        356

SEQ ID NO: 6            moltype = AA  length = 656
FEATURE                 Location/Qualifiers
source                  1..656
                        mol_type = protein
                        organism = synthetic construct
SEQUENCE: 6
MHAMAGGEAQ VALQAVAQGL RWTYSLLWYL CRHQGTALVW AEGHYNGAVK TRKTVQPPAA     60
VAAGAEEDSA DHAARHRSRQ LRELYDWLAG EAAAGGGAG GTATGSGGGV QAASCRRPS      120
AALSPEDLTE TEWFFLMSAS YSFPSGVGLP GRAFARGRHV WLTGANEVDS KVFLRAILAK    180
TVVCIPIVDG VLEIGTTEKV EEDAGLVQYA RSIFMDHHGI HMKPTLSEHS TSNPVAHMDQ    240
QSSQVQMQKC TGQTKMDSDE LNPEDEDDET ENDDEGLSGS ETYYTDTVRN SSQVQTPLNM    300
```

|  |  |  |
|---|---|---|
| VSNGRTTPNV | GTSELMQCDM SEVVRDGCSN NLEEEIQMLM DCQNSNGQFN LQGPDEPCHS | 360 |
| WHFLYEELNG | CLPGAEDQVT SPENSHYPQT LLTILQFNAR RQTELNIKNY LPVSEKSSFS | 420 |
| RWNHKGIADN | QGMITQGTPQ RMLRSILMNA PSSHCSYKEA QTPKSRGGKG ANGLRKIGTV | 480 |
| QGDFSANHVL | KERKRREKLN EKFIILRSLV PFMTKMDKTS ILGDTIEYVK QLRKRIQDLE | 540 |
| SRARPATTTA | RKRRGRAAEG SSSSAAAVAG GETEVQVSII ESDALLELRC GCRDGLLLRV | 600 |
| MQALQELQLE | VTAVQASSAD GVLVAELRAK VKEARGRRKS SISQVKRAIH LVLSSP | 656 |

```
SEQ ID NO: 7           moltype = DNA   length = 20
FEATURE                Location/Qualifiers
source                 1..20
                       mol_type = other DNA
                       organism = synthetic construct
SEQUENCE: 7
gcaccccagg ctttacactt                                              20

SEQ ID NO: 8           moltype = DNA   length = 20
FEATURE                Location/Qualifiers
source                 1..20
                       mol_type = other DNA
                       organism = synthetic construct
SEQUENCE: 8
cgtggcctct aatgaccgaa                                              20

SEQ ID NO: 9           moltype = DNA   length = 20
FEATURE                Location/Qualifiers
source                 1..20
                       mol_type = other DNA
                       organism = synthetic construct
SEQUENCE: 9
gtgcgtcatc ccttacgtca                                              20

SEQ ID NO: 10          moltype = DNA   length = 21
FEATURE                Location/Qualifiers
source                 1..21
                       mol_type = other DNA
                       organism = synthetic construct
SEQUENCE: 10
actgggcaca acagacaatc g                                            21

SEQ ID NO: 11          moltype = DNA   length = 23
FEATURE                Location/Qualifiers
source                 1..23
                       mol_type = other DNA
                       organism = synthetic construct
SEQUENCE: 11
gcatcagcca tgatggatac ttt                                          23

SEQ ID NO: 12          moltype = DNA   length = 20
FEATURE                Location/Qualifiers
source                 1..20
                       mol_type = other DNA
                       organism = synthetic construct
SEQUENCE: 12
gaaacagaga acgacgacga                                              20

SEQ ID NO: 13          moltype = DNA   length = 20
FEATURE                Location/Qualifiers
source                 1..20
                       mol_type = other DNA
                       organism = synthetic construct
SEQUENCE: 13
ggtgtttggg cttccttgta                                              20

SEQ ID NO: 14          moltype = DNA   length = 21
FEATURE                Location/Qualifiers
source                 1..21
                       mol_type = other DNA
                       organism = synthetic construct
SEQUENCE: 14
atcccactat ccttcgcaag a                                            21

SEQ ID NO: 15          moltype = DNA   length = 20
FEATURE                Location/Qualifiers
source                 1..20
                       mol_type = other DNA
                       organism = synthetic construct
SEQUENCE: 15
ggatcgagta gtgggcttcg                                              20
```

-continued

```
SEQ ID NO: 16          moltype = DNA  length = 855
FEATURE                Location/Qualifiers
source                 1..855
                       mol_type = other DNA
                       note = nucleotide sequences of Rd
                       organism = synthetic construct
SEQUENCE: 16
atggacttcg agtccgagga cccggagaac gaggtggtca agcccaccgt ggaagggatg    60
ctgagcatca tgcgggcctg cagggacgcc ggcaccgtca agcgcatcgt cttcacctcc   120
tccgccggga ccgtcaacat cgaggagcgg cagcgcccct cctacgacca cgacgactgg   180
agcgacatcg acttctgccg ccgcgtcaag atgaccggat ggatgtactt cgtgtccaag   240
tcattggcgg agaaggccgc catggaatac gcgagggagc acgggctgga cctcatcagc   300
gtcatcccca cgctcgtcgt cgggcccttc atcagcaacg ggatgccgcc gagccacgtc   360
accgcgctgg cgctgctcac ggggaacgag gcccactact cgatcctgaa gcaggtgcag   420
ttcgtccacc tcgacgacct ctgcgacgcc gagatcttcc tcttcgagag ccccgaggcg   480
cgcggccgct acgtctgctc ctcccacgac gccaccatcc acggcctcgc gacgatgctc   540
gcggacatgt tccggagta cgacgtgccg cggagctttc ccgggatcga cgccgaccac   600
ctccagccgg tgcacttctc gtcgtggaag ctcctcgccc acgggttcag gttcaggtac   660
acgctggagg acatgttcga ggccgccgtc cggacgtgca gggagaaggg gcttctcccg   720
ccgctgccgc caccgccgac gacggccgtg gccggaggag acggctcggc gggtgtggcc   780
ggcgagaagg aaccgatact ggggaggggg accgggacgg cggttggtgc tgaaacagaa   840
gcgttggtca aatga                                                   855
```